United States Patent
Funk et al.

(10) Patent No.: US 11,416,600 B2
(45) Date of Patent: Aug. 16, 2022

(54) UNLOCKING PASSWORDS IN AUGMENTED REALITY BASED ON LOOK

(71) Applicant: Siemens Aktiengesellschaft, Munich (DE)

(72) Inventors: Markus Funk, Berkeley, CA (US); Mareike Kritzler, San Francisco, CA (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/603,625

(22) PCT Filed: Apr. 24, 2018

(86) PCT No.: PCT/US2018/029039
§ 371 (c)(1),
(2) Date: Oct. 8, 2019

(87) PCT Pub. No.: WO2018/200449
PCT Pub. Date: Nov. 1, 2018

(65) Prior Publication Data
US 2020/0117789 A1     Apr. 16, 2020

Related U.S. Application Data

(60) Provisional application No. 62/489,011, filed on Apr. 24, 2017.

(51) Int. Cl.
*G06F 21/36* (2013.01)
*G02B 27/00* (2006.01)
(Continued)

(52) U.S. Cl.
CPC ......... *G06F 21/36* (2013.01); *G02B 27/0093* (2013.01); *G02B 27/017* (2013.01);
(Continued)

(58) Field of Classification Search
CPC .......... G06F 21/32; G06F 21/36; G06F 21/30; G06F 21/31; G06F 21/316; G06F 3/011;
(Continued)

(56) References Cited

U.S. PATENT DOCUMENTS 8,659,433 B2 * 2/2014 Petrou ............... G06F 1/163
340/573.7
9,354,445 B1 * 5/2016 Weaver ............... G06F 3/013
(Continued)

FOREIGN PATENT DOCUMENTS

EP      2887253 A1    6/2015

OTHER PUBLICATIONS

M. T. Hossan, M. Z. Chowdhury, M. Shahjalal and Y. M. Jang, "Human Bond Communication with Head-Mounted Displays: Scope, Challenges, Solutions, and Applications," in IEEE Communications Magazine, vol. 57, No. 2, pp. 26-32, Feb. 2019. (Year: 2019 ).*
(Continued)

*Primary Examiner* — Kari L Schmidt (57) ABSTRACT

A method of using a head-mounted display to enable the display of confidential data includes authenticating a user by placing the HMD on the user's head, moving the HMD by moving the user's head to facilitate the user looking at a series of N objects in a predefined order, and providing access to the confidential data in response to the user looking at the predefined series of N objects in the predefined order and within a predefined time frame.

19 Claims, 5 Drawing Sheets

(51) Int. Cl.
  *G02B 27/01* (2006.01)
  *G06F 3/04815* (2022.01)
  *G06T 19/00* (2011.01)
  *G06F 21/31* (2013.01)
  *H04L 9/40* (2022.01)
  *G06F 21/30* (2013.01)
  *G06F 21/32* (2013.01)
  *G06F 3/01* (2006.01)

(52) U.S. Cl.
  CPC .......... *G06F 3/04815* (2013.01); *G06F 21/30* (2013.01); *G06F 21/316* (2013.01); *G06F 21/32* (2013.01); *G06T 19/006* (2013.01); *H04L 63/08* (2013.01); *H04L 63/0861* (2013.01); *G06F 3/011* (2013.01); *G06F 3/013* (2013.01)

(58) Field of Classification Search
  CPC ..... G06F 3/013; H04L 63/08; H04L 63/0861; H04W 12/06
  See application file for complete search history.

(56) References Cited

U.S. PATENT DOCUMENTS

| | | | | |
|---|---|---|---|---|
| 9,588,343 | B2* | 3/2017 | Moravetz | G02B 27/0172 |
| 10,156,900 | B2* | 12/2018 | Publicover | H04L 63/0861 |
| 10,620,700 | B2* | 4/2020 | Publicover | H04N 5/23229 |
| 2012/0243729 | A1 | 9/2012 | Pasquero | |
| 2013/0044055 | A1* | 2/2013 | Karmarkar | G06F 21/316 |
| | | | | 345/158 |
| 2013/0135204 | A1* | 5/2013 | Raffle | G06F 3/013 |
| | | | | 345/158 |
| 2014/0125574 | A1* | 5/2014 | Scavezze | G06F 3/013 |
| | | | | 345/156 |
| 2014/0126782 | A1 | 5/2014 | Takai et al. | |
| 2014/0283007 | A1* | 9/2014 | Lynch | G06F 21/316 |
| | | | | 726/17 |
| 2015/0084864 | A1 | 3/2015 | Geiss et al. | |
| 2015/0135309 | A1* | 5/2015 | Karmarkar | G06K 9/00617 |
| | | | | 726/19 |
| 2015/0153571 | A1* | 6/2015 | Ballard | G02B 27/017 |
| | | | | 345/8 |
| 2015/0264031 | A1* | 9/2015 | Liu | H04L 63/08 |
| | | | | 726/7 |
| 2016/0124501 | A1* | 5/2016 | Lam | G06F 3/017 |
| | | | | 345/156 |
| 2016/0232259 | A1* | 8/2016 | Williams | G06T 17/20 |
| 2016/0247324 | A1* | 8/2016 | Mullins | G02B 27/0179 |
| 2016/0253563 | A1* | 9/2016 | Lam | H04L 63/08 |
| | | | | 348/130 |
| 2017/0115736 | A1* | 4/2017 | Patel | G06F 3/04883 |
| 2017/0263091 | A1* | 9/2017 | Kerzner | G08B 13/19645 |
| 2017/0318019 | A1* | 11/2017 | Gordon | G06F 3/013 |
| 2017/0346817 | A1* | 11/2017 | Gordon | G02B 27/0172 |
| 2018/0158053 | A1* | 6/2018 | Adams | G06F 3/011 |
| 2018/0158060 | A1* | 6/2018 | Adams | G06Q 20/3224 |
| 2018/0323972 | A1* | 11/2018 | Reed | H04L 67/38 |
| 2018/0332036 | A1* | 11/2018 | Mokhasi | G06Q 20/40145 |
| 2019/0216392 | A1* | 7/2019 | Bower | A61B 5/4076 |
| 2019/0332751 | A1* | 10/2019 | Brady | G06F 21/32 |
| 2019/0379671 | A1* | 12/2019 | Sundar | G06F 3/0426 |
| 2020/0089855 | A1* | 3/2020 | Chou | G06F 3/013 |
| 2020/0160345 | A1* | 5/2020 | Damania | G06V 40/16 |

OTHER PUBLICATIONS

S. Seneviratne et al., "A Survey of Wearable Devices and Challenges," in IEEE Communications Surveys & Tutorials, vol. 19, No. 4, pp. 2573-2620, Fourthquarter 2017. (Year: 2017).*
Franziska Roesner, Tadayoshi Kohno, and David Molnar. 2014. Security and privacy for augmented reality systems. Commun. ACM 57, 4 (Apr. 2014), 88-96. (Year: 2014).*
Fidas, Christos. "Eye tracking based cognitive-centered user models." IEEE/WIC/ACM International Conference on Web Intelligence. 2019. pp. 433-437. (Year: 2019).*
PCT International Search Report and Written Opinion of International Searching Authority dated Jun. 18, 2018 corresponding to PCT International Application No. PCT/US2018/029039 filed Apr. 24, 2018.

* cited by examiner

UNLOCKING PASSWORDS IN AUGMENTED REALITY BASED ON LOOK

TECHNICAL FIELD

The present disclosure is directed, in general, to the use of augmented reality in an industrial setting and more specifically, to a system and method for providing secure access to data using a wearable augmented reality system.

BACKGROUND

Augmented Reality (AR) is a technology in which digital information is presented on top of or in relationship to the physical space or a real-world object. There are different hardware approaches in order to visualize AR content including, see-through head-mounted displays (HMD), hand-held devices in which the reality is seen through a camera (e.g. smartphones or tablets), or using a projector displaying information on top of the physical space. Hand-held approaches can interfere with the user's ability to use their hands and AR experiences using a projector are typically stationary.

Head-mounted displays (HMDs) are becoming more popular. They can be used to overlay the user's view of the real world with an additional digital information layer. Depending on the technology that is being used, the information can either be presented at a fixed position on the screen or presented spatially aligned at a distinct position directly in the real space. HMDs are also referred to as smart glasses or smart eye-wear. Popular examples of HMDs include Google's Google Glass®, Microsoft's Microsoft HoloLens®, and the Meta Company's Meta 2®.

The Microsoft HoloLens® is a HMD that is capable of creating a spatial room model of the physical space. At all times, the device is aware of the user's position in the room and is constantly updating the room model according to potential changes in the geometry and the user's point of view.

SUMMARY

In one construction, a method of using a head-mounted display to enable the display of confidential data includes authenticating a user by placing the HMD on the user's head, moving the HMD by moving the user's head to facilitate the user looking at a series of N objects in a predefined order, and providing access to the confidential data in response to the user looking at the predefined series of N objects in the predefined order and within a predefined time frame, wherein N is greater than zero.

In another construction, a method of using a head-mounted display (HMD) to enable the display of confidential data includes authenticating a user by initiating a login process, starting a timer, moving the HMD with the user's head to facilitate the user looking at a first object. The method also includes moving the HMD with the user's head to facilitate the user looking at a second object, moving the HMD with the user's head to facilitate the user looking at an Nth object, and providing access to the confidential data in response to looking at the first object through the Nth object in a predefined order prior to the passage of a predetermined amount of time as measured by the timer.

In yet another system, a method of using a head-mounted display (HMD) to enable the display of confidential data includes authenticating a user by initiating a login process, moving the HMD with the user's head to facilitate the user looking at a first object within a predefined time from the initiation of the login process, moving the HMD with the user's head to facilitate the user looking at an Xth object within a predefined time from the completion of looking at the X−1 object, and providing access to the confidential data in response to looking at the first object through an Nth object in a predefined order without exceeding any of the predefined times.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

With the advent of the Internet of Things (IoT) and the increased level of factory automation and instrumentation, the amount of data that is produced on a shop floor in a smart factory continues to increase. To work efficiently and to deal with the increasing complexity of smart factories, it is very important for factory workers and managers to have relevant information about the factory available to them at all times.

Usually, data about a factory is confidential and can only be viewed by authorized experts that have the proper security access level. However, implementing this security layer can be difficult and hinders the goal of providing easy access to necessary data at all times.

Figure 1:
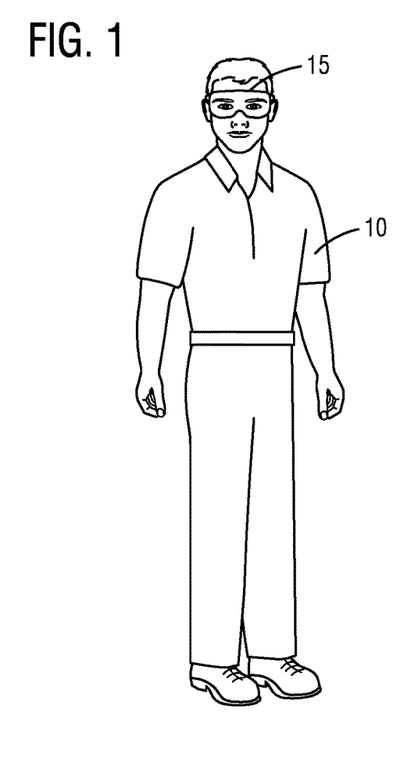
FIG. 1 is a schematic illustration of a user with a head-mounted display.

FIG. 1 illustrates a user 10 wearing an augmented reality (AR) device in the form of a head-mounted display 15 (HMD). AR devices such as the head-mounted display 15 of FIG. 1 allow visualizations that map the data created in the factories directly into the physical space of the factories and can help to manage the available data directly at the source of origin.

Figure 2:
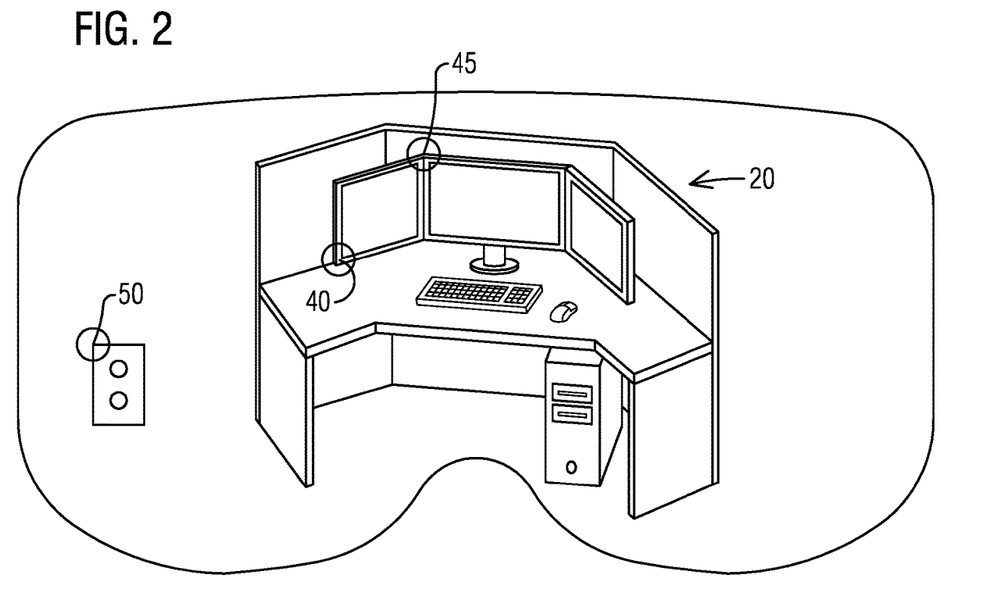
FIG. 2 is the user's view of a workspace through the HMD of FIG. 1 illustrating a spatial password.
Figure 3:
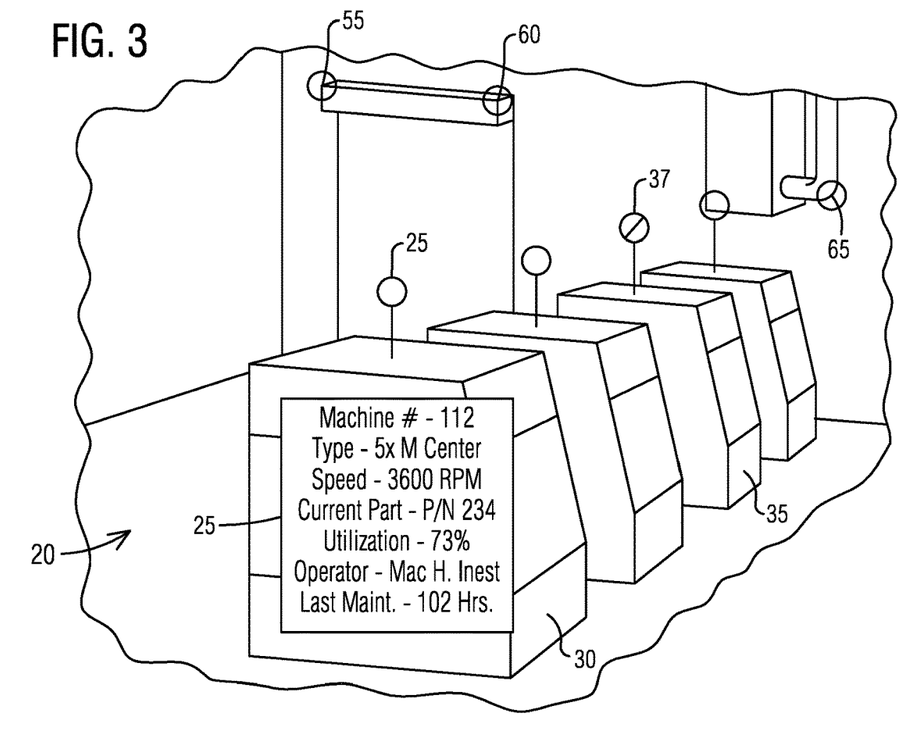
FIG. 3 is a perspective view of a manufacturing shop floor through a head-mounted display illustrating digital information available to the user.

The HMD 15 of FIG. 1 includes a translucent visor that can be seen through by the user 10 to allow the user 10 to see the actual or physical space 20 (shown in FIG. 2). A virtual space including virtual objects 25 (shown in FIG. 3), can be projected onto the lens and introduced into the physical space 20 to create the augmented reality. The virtual objects 25 could be 2D images or 3D images, sound, 2D or 3D objects as may be required. For example, as illustrated in FIG. 3 the user 10 could walk through a production space 20 and look at an actual machine 30 that is being operated. Data such as the machine's current utilization rate and maintenance history could be projected onto the machine 30 as a 2D note 25. Data about the operator, such as a name or company history could be projected onto the operator or the machine 30 to further aid the user 10. When the user 10 turns to look at a second machine 35, an indictor 37 positioned over the machine 35 could indicate that it is down for maintenance. The user 10 could look at the machine and use hand gestures or other techniques to get additional information including the schedule for the repair and a listing and visual representation of replacement parts that are needed. In this way, the user 10 could simply walk through the factory and gain a basic understanding of the status of the machines, processes, and people within that factory.

In the scenario just described, some of the data presented could be confidential and available to only certain users 10. To control this, security protocols are put in place that require the user 10 to "login" with the HMD 15 in order to view the available data. However, user authentication when using HMDs 15 can be a very cumbersome process. Typically, systems use an on-screen keyboard and virtual selection of the characters for the password input. This process takes time and can be frustrating for the users 10, thereby reducing the likelihood of them using the HMD 15 as desired.

FIGS. 2-7 illustrate a system and method for quickly, easily, and reliably implementing the desired security protocols without discouraging the user 10. Specifically, FIGS. 2, 3, 6, and 7 illustrate multiple variations of a look to unlock password. As discussed, the head-mounted display 15 of FIG. 1 is a spatially-aware smart device that projects virtual information onto the actual or physical space 20 or object and is also aware of its position and orientation within a space or room. This spatial awareness assures that the HMD 15 properly identifies objects within the physical space 20 by simply looking or gazing at them.

Figure 6:
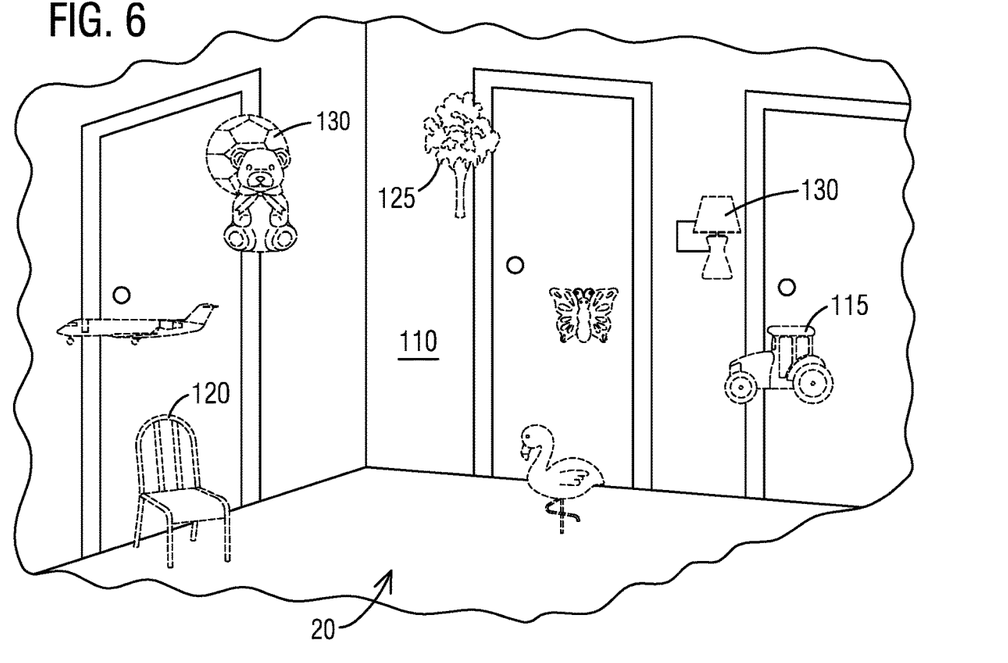
FIG. 6 is the user's view of a workspace through the HMD of FIG. 1 illustrating a virtual password.
Figure 7:
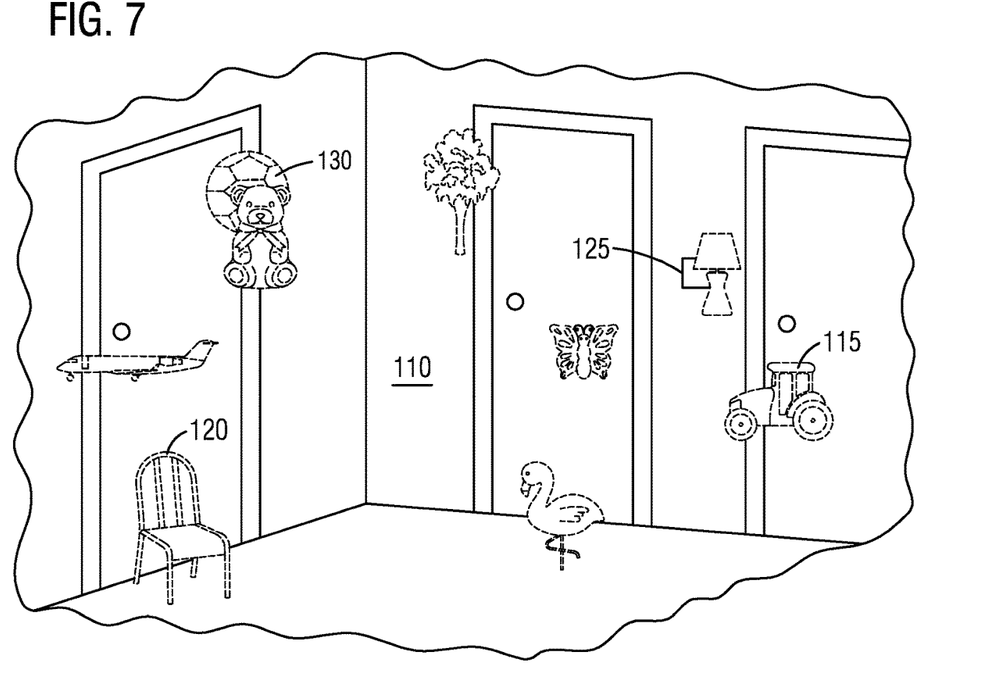
FIG. 7 is the user's view of a workspace through the HMD of FIG. 1 illustrating a hybrid password.

When using spatially-aware HMDs, three versions of the look to unlock password are possible; a spatial password (FIGS. 2 and 3), a virtual password (FIG. 6), or a hybrid password (FIG. 7). As will be described in greater detail, the spatial password utilizes actual physical objects within the physical space 20 for password elements, the virtual password uses virtual objects that exist only in the virtual space for password elements, and the hybrid password uses objects from both the physical space and the virtual space as password elements.

FIG. 2 illustrates a login process that greatly simplifies the use of the HMD 15 and uses a spatial password. As illustrated in FIG. 2, the user 10 picks a number of distinct points 40, 45, 50 in the physical space 20 and in a particular order. The points 40, 45, 50 can be preselected by the user much like a user picks a password or can be defined by another. This pattern becomes that user's spatial password for the HMD 15. In the illustrated construction, the user 10 first looks at the lower left corner of the leftmost monitor 40. The user 10 then looks at the top inside corners of the two monitors 45. Finally, the user 10 looks at the upper left corner of the wall outlet 50 to complete the login. Typically, three or more points 40, 45, 50 should be used as a password. Of course, more or fewer points 40, 45, 50 could be required for the login if desired. In addition, a time limit for inputting or looking at the necessary points 40, 45, 50 is typically established. For example, one construction uses a timer (in a separate computer or the HMD 15) to provide the user 10 ten seconds or to look at the necessary points 40, 45, 50 in the correct order to complete the login. Of course, longer or shorter times could be used as desired. In addition, while examples with three points 40, 45, 50 are discussed in the foregoing example, other constructions could use any number of points with longer passwords being harder to crack and shorter passwords being faster to input.

In some constructions, the HMD 15 provides a visual or audible signal as each point is looked at to aid the user 10 in completing the login process. For example, one construction illuminates the selected point with a translucent colored box when it is correctly selected. Because the preferred HMDs 15 are spatially-aware devices, the user 10 can stand anywhere in the room and look at the selected points 40, 45, 50. In other words, the user 10 does not have to stand in the same location each time a login is required. Thus, as illustrated in FIG. 3 if a user 10 selected points 55, 60, 65 that were visible everywhere on a factory floor (e.g., features in the roof or ceiling) the user 10 could complete the login from any location within the factory. In addition, since only the user 10 knows the order and the position of the specific points 55, 60, 65, the technique protects the user 10 against eavesdropping as a potential attacker cannot distinguish if the user 10 is entering a password by looking at the space or if the user 10 is already logged in and viewing content. However, because the specific points 55, 60, 65 are located within a particular space, login when outside of that space would be impossible. Thus, this type of login would be limited to certain rooms, factories, machines, or locations in a building for example.

In one construction, the user 10 first defines a password by clicking on distinct areas in the room using a tap gesture or another gesture. The order in which the distinct areas are added becomes the order in which they must be looked at in order to login. As noted, in future logins the user 10 only has to look at the pre-designated points, within the specific time frame, and in the correct order in which they were defined. If the user 10 does this unlocking process (login process) correctly, the HMD 15 will be unlocked and the user 10 can access and view confidential information at the level their particular login allows. During the unlocking procedure (login process), the points are preferably not highlighted in any way (until they are selected), as knowing each correct area is a prerequisite for entering the login password. However, some indication of a selection, such as a tone, a flash, or highlighting the point in a translucent geometric shape can be given to queue the user 10 to move to the next point.

Thus, users 10 wearing a head-mounted display 15 can quickly and easily authenticate themselves in order to access and view confidential content on the HMD 15. The user 10 simply enters his or her spatial password by looking or gazing at distinct points, in a distinct order in the user's physical space while wearing the HMD.

Figure 4:
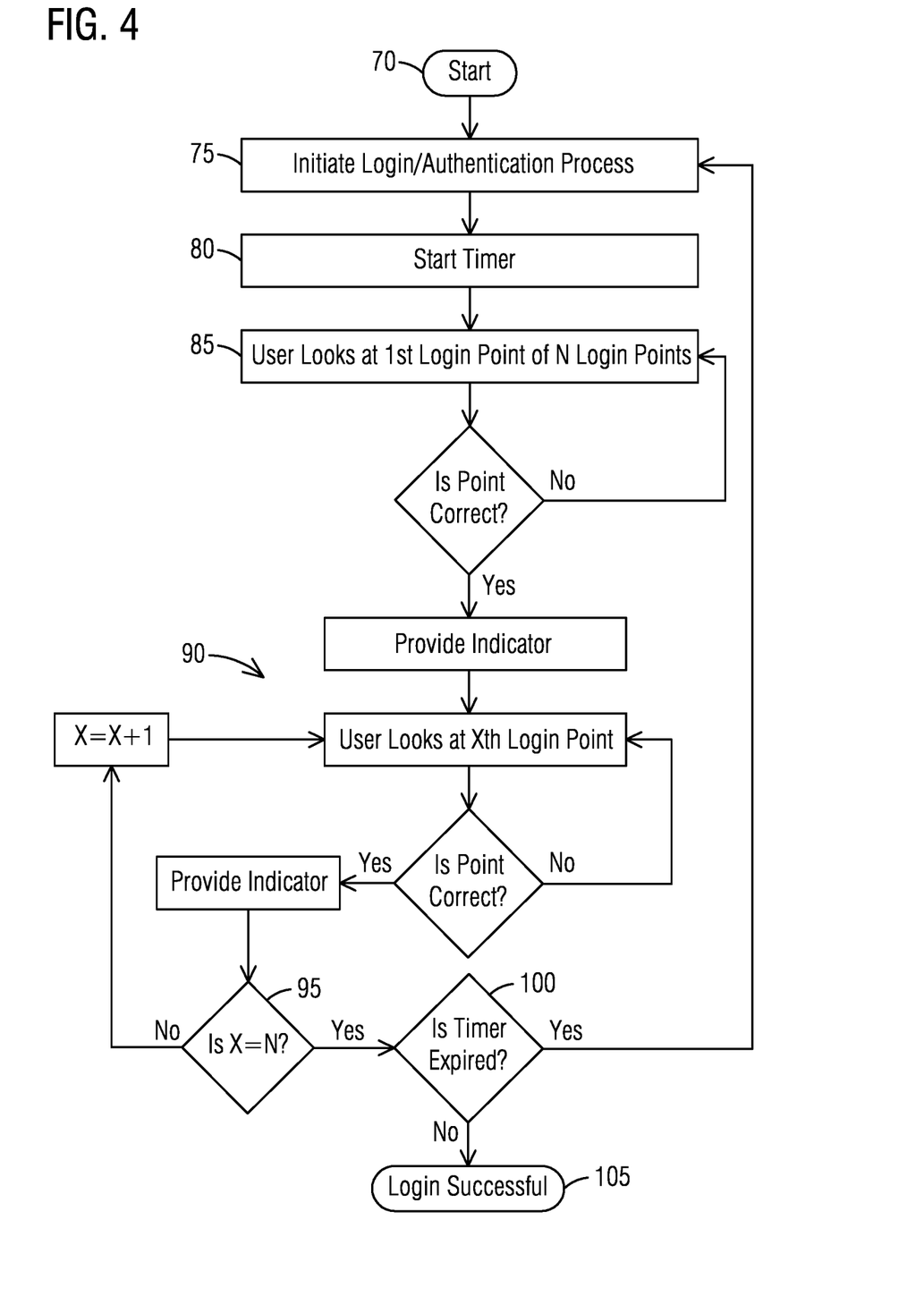
FIG. 4 is a flowchart illustrating one possible login process.

FIG. 4 is a flow chart illustrating the most significant steps in the login process just described. Specifically, the login process starts at the start block 70 with the first step being the user 10 initiating the authentication process 75. This could be started with a particular gesture, with the entry of a text field, with a verbal command, by turning on the HMD with the login process being required before use of the device can begin operation, or any other suitable technique. The next step is to start a timer 80, if a timer 80 is employed, that is either part of an outside computer system or part of the user's HMD 15. Typically, the timer 80 sets a limit of between 10 seconds and 60 seconds with other time limits being possible. The user 10 then turns to look at the first point of his or her login 85. If the point is the correct point, the user 10 can move on to the next point. In some constructions an indicator is provided to queue the user 10 to move on. A loop 90 is repeated for each subsequent point until the Nth point is reached with N being the number of points required to complete the login (step 95). Once the last point is entered, the timer 80 is checked at step 100 to verify that the points were entered in the required amount of time. Alternatively, the timer 80 operates in the background and if the predetermined time is exceeded, the login process is considered failed and is immediately restarted. Typically, the timer runs throughout the login process and once the timer expires, the process is interrupted and returned to the start block 70. If the timer has not expired, and the points are looked at and therefore entered correctly, the login is complete (step 105) and the user 10 has access to the data associated with his or her account. Also, as noted above, the use of the timer 80 is optional and could be completely omitted if desired.

Figure 8:
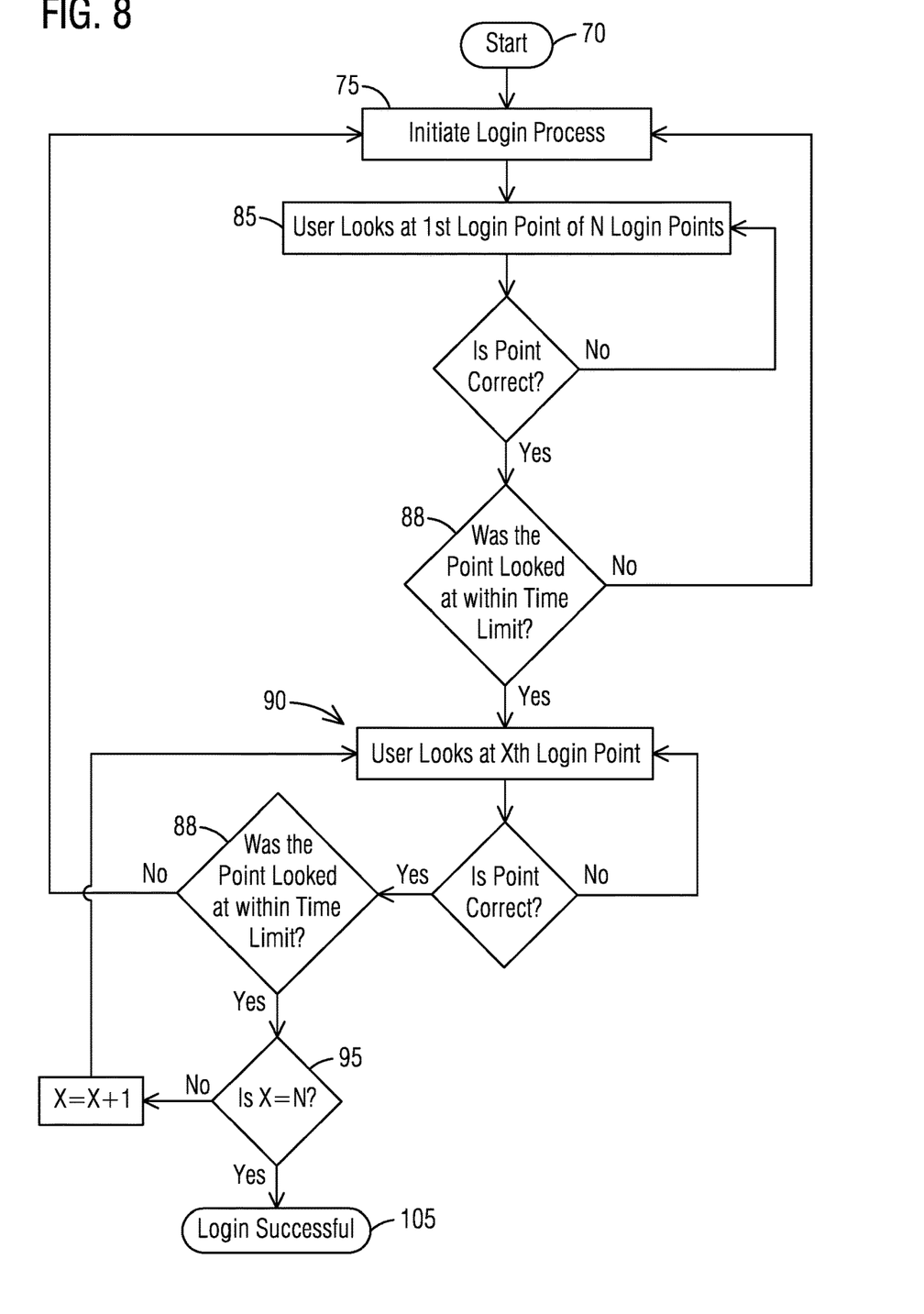
FIG. 8 is a flowchart illustrating another possible login process.

In another similar login process, the timer 80 could be used at each step rather than, or in addition to timing the entire login cycle. FIG. 8 is a flow chart illustrating this process which includes many steps similar to those shown in FIG. 4. However, after the user selects the first point 85, the system verifies that the selection was made within a predetermined time limit 88 (e.g., 5 to 60 seconds). Preferably, the time limit is compared to the time between initiation of the login process and the user looking at the first point. Alternatively, the timer simply operates in the background and reinitiates the login process if any of the predetermined time limits are exceeded. The user then looks at the next point 90 and must do so within the predefined time limit. After looking at the first point, the time limit is compared to the time that passes between looking at the current point and the point immediately prior (The X−1 point). This process continues until the user looks at the Nth or last point. If each point is looked at within the predetermined time limits, the login is successfully completed 105. However, if any one of the time limits is exceeded, the login process is immediately re-initiated. It should be understood that various aspects of the login processes illustrated in FIGS. 4 and 8 can be combined in any number of ways to achieve the level of security desired for a particular application.

In some constructions, if the user selects an incorrect point, the login process is terminated, and the user must re-start the login process. In other constructions, the use may be allowed a number of incorrect selections before the process must be re-started. For example, in one system a user is allowed two incorrect selections at each point. If the third selection is incorrect, the process must be restarted. In still other constructions, the user is allowed a total number of errors throughout the process. For example, the user may be allowed three incorrect selections during the process of selecting three points. In this scenario, if the user incorrectly selects two points while trying to select the first point, that user will have one error left before being required to restart the process. Of course, any combination of these arrangements could also be implemented if desired.

The login process and the password generation process just described are similar for virtual passwords and for hybrid passwords as the only real difference is the element that makes up the various selected points. In constructions that include virtual elements 130 (shown in FIGS. 6 and 7), one method provides a number of pre-selected virtual objects 130 in a password space 110 that appears to the user each time a password is required. The pre-selected objects 130 could be selected beforehand and used repeatedly or could be randomly selected from a large group of options or from a pre-selected subgroup at each login by the computer. For example, one system includes hundreds of potential objects including animals, toys, vehicles, sports equipment, etc. The user can allow the computer to randomly select and display objects from this list, could identify a sub-group (e.g., only animals), or could pick a number of specific objects that are always displayed. In one construction, the password space 110 includes a one meter by one meter square cross sectioned annular area spaced one meter from the user (i.e., a square donut surrounding the user). Within that volume, the HMD 15 places the pre-selected objects 130 at random locations. The objects 130 could appear as 2D or 3D objects as desired. The user then selects the correct objects 130 in the correct order to enter the password. For example, FIG. 6 illustrates a potential password space 110 that includes a number of virtual objects 130 randomly positioned in the desired space. The user selects the three objects 130 that make up the password by looking at them in the correct order. In this example, the first point is the tractor 115, the second point is the chair 120, and the third point is the tree 125.

The virtual passwords have several advantages over spatial passwords. For example, the virtual passwords allow the user to login from any location since the objects 130 are simply displayed by the HMD 15. In addition, because the virtual objects 130 are randomly positioned, the user must look in different directions and must make different movements each time a login is attempted.

Hybrid passwords, illustrated in FIG. 7 include password elements that are both spatial and virtual. A system that uses a hybrid password would be restricted to a particular location as at least one spatial object would need to be selected. However, the hybrid passwords would have the added security offered by the virtual passwords as at least one virtual element 130 would need to be selected. As with virtual passwords, hybrid passwords are created and entered as described above with regard to the spatial passwords. FIG. 7 illustrates an example of a hybrid password. In this example, the password space 110 includes a number of virtual objects 130 randomly positioned in the desired space and overlying the physical space 20. The use selects the three objects that make up the password by looking at them in the correct order. In this example, the first point is the tractor 115, the second point is the chair 120, and the third point is the HVAC control 125 mounted on the wall which is a physical object in the physical space 20.

Figure 5:
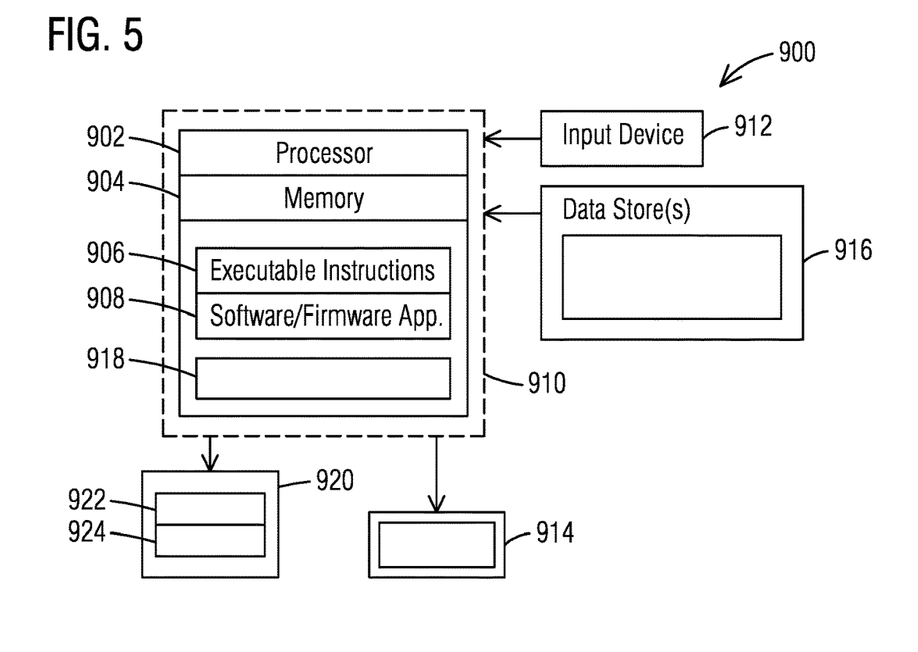
FIG. 5 is a schematic illustration of a data processing system.

With reference to FIG. 5, an example data processing system 900 is illustrated that facilitates carrying out one or more of the embodiments described herein. The system 900 may comprise a combination 910 including at least one processor 902 (e.g., a microprocessor/CPU) that is configured to carry out various processes and functions described herein by executing from a memory 904, executable instructions 906 (such as software/firmware instructions) corresponding to one or more software/firmware applications 908 or portions thereof that are programmed to cause the at least one processor 902 to carry out the various processes and functions described herein.

As used herein a processor 902 (sometimes referred to as a controller or control system) corresponds to any electronic device that is configured via hardware circuits, software, and/or firmware to process data. For example, processors 902 described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination 910 of the processor 902 with the software instructions 906 loaded/installed into the described memory 904 (volatile and/or non-volatile), which are currently being executed and/or are available to be executed by the processor 902 to cause the processor 902 to carry out the described/claimed process or function. Thus, a processor that is powered off or is executing other software, but has the described software instructions installed on a storage device in operative connection therewith (such as a hard drive or SSD) in a manner that is setup to be executed by the processor (when started by a user, hardware and/or other software), may also correspond to the described/claimed processor 902 that is configured to carry out the particular processes and functions described/claimed herein.

Memory 904 may correspond to an internal or external volatile memory (e.g., main memory, CPU cache, and/or RAM), that is included in the processor and/or in operative connection with the processor. Such a memory 904 may also correspond to a nonvolatile memory (e.g., flash memory, SSD, hard drive, or other storage device or non-transitory computer readable media) in operative connection with the processor 902.

The described data processing system 900 may include at least one input device 912 and at least one display or output device 914 in operative connection with the processor 902. The input device 912, for example, may include a mouse, keyboard, touch screen, gesture input device, or other type of input device capable of providing user inputs to the processor 902. The display device 914, for example, may include an LCD or AMOLED display screen, monitor, head-mounted display, or any other type of display device or output device capable of displaying outputs from the processor 902. For example, the processor 902, memory 904, software instructions 906, input device 912, and display device 914, may be included as part of a data processing system corresponding to a PC, workstation, server, notebook computer, tablet, mobile phone, head-mounted display, or any other type of computing system, or any combination thereof.

The data processing system 900 may also include one or more data stores 916. The processor 902 may be configured to manage, retrieve, generate, use, revise, and store data and/or other information described herein from/in the data store 916. Examples of a data store may include a file and/or a record stored in a database (e.g., Oracle, Microsoft SQL Server), file system, hard drive, SSD, flash drive, memory card and/or any other type of device or system that stores non-volatile data.

It is important to note that while the disclosure includes a description in the context of a fully functional system 900 and/or a series of acts, those skilled in the art will appreciate that at least portions of the mechanism of the present disclosure and/or described acts are capable of being distributed in the form of computer/processor executable instructions (e.g., the described software instructions and/or corresponding firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C #, C++ or any other form of code that can be programmed/configured to cause at least one processor to carry out the acts and features described herein. Still further, results of the described/claimed processes or functions may be stored in a computer-readable medium 916, displayed on a display device 914, and/or the like.

Also, it should be appreciated that many devices referred to as input devices 912 or output devices 914 may both provide inputs and receive outputs of communications with the data processing system 900. For example, the processor 902 may be integrated into a housing (such as a tablet or head-mounted display) that includes a touch screen or that is capable of capturing motion gesture inputs that serves as both an input and display device. Further, it should be appreciated that some input devices may include a plurality of different types of input devices (e.g., touch screen, touch pad, and keyboard).

Other devices 922 in addition to a communication controller 924 may be connected to the system 900 which can be any local, wide area, remote, private, and/or public data processing system network or combination of networks, as known to those of skill in the art, including the Internet.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud space. For example, the processor 902 and associated components may correspond to the combination of one or more virtual machine processors of a virtual machine operating in one or more physical processors of a physical data processing system.

Also, it should be noted that the processor 902 described herein may correspond to a remote processor located in a data processing system such as a server that is remote from the display 914 and input devices 912 described herein. In such an example, the described display device 914 and input device 912 may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system 900 may vary for particular implementations. For example, the data processing system 900 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of using a head-mounted display (HMD) to enable the display of confidential data, the method comprising:

authenticating a user by:
  placing the HMD on the head of the user;
  moving the HMD by moving the head of the user to facilitate the user looking at a series of N objects, each object defined at a distinct point in a physical space in a predefined order;
  mapping each object of the N objects to a spatial position in the physical space;
  providing at least one virtual object in a password space, the password space defined by a square cross-section annular ring surrounding the user; and
  providing access to the confidential data in response to the user looking at a spatial position in the physical space corresponding to each object of the predefined series of N objects in the predefined order and within a predefined time frame, wherein N is greater than zero, and wherein at least one of the N objects is a physical object, wherein the user may be positioned anywhere within the physical space when looking at the spatial position of each object.

2. The method of claim 1, wherein N is greater than or equal to three.

3. The method of claim 1, further comprising moving the HMD by moving the head of the user to look at an object in the physical space and displaying confidential data about that object in the HMD.

4. The method of claim 1, wherein each of the N objects is a physical object positioned within a single physical space.

5. The method of claim 4, wherein the N objects are selected such that each of the N objects is visible from any point within the physical space.

6. The method of claim 5, wherein the user can be positioned at any point in the physical space during the authentication steps.

7. The method of claim 1, wherein the predefined time frame is between 10 seconds and 60 seconds.

8. The method of claim 1, further comprising displaying a password space including a plurality of pre-selected virtual objects.

9. The method of claim 8, wherein at least one of the N objects is a virtual object selected from the pre-selected virtual objects and at least one of the N objects is a physical object that is positioned within a fixed physical space.

10. A method of using a head-mounted display (HMD) to enable the display of confidential data, the method comprising:
  authenticating a user by:
    initiating a login process;
    starting a timer;
    moving the HMD with the head of the user to facilitate the user looking at a first distinct point in a physical space containing a first object;
    moving the HMD with the head of the user to facilitate the user looking at a second distinct point in the physical space containing a second object;
    moving the HMD with the head of the user to facilitate the user looking at an Nth object;
    mapping each object of the N objects to a spatial position in the physical space;
    defining at least one of the N objects as a virtual object in a password space, the password space defined by a square cross-section annular ring surrounding the user; and
    providing access to the confidential data in response to looking at a spatial position in the physical space corresponding to the first object through the Nth object in a predefined order prior to the passage of a predetermined amount of time as measured by the timer, wherein at least one of the N objects is a physical object positioned within the physical space and wherein the user may be positioned anywhere within the physical space when looking at the spatial position of each object.

11. The method of claim 10, further comprising moving the HMD by moving the head of the user to look at an object in the physical space and displaying confidential data about that object in the HMD.

12. The method of claim 10, wherein each of the N objects is a physical object positioned within the physical space.

13. The method of claim 10, wherein at least one of the N objects is a virtual object selected from the pre-selected virtual objects and at least one of the N objects is the physical object that is positioned within the physical space.

14. The method of claim 10, further comprising immediately re-initiating the login process when the predetermined amount of time passes.

15. A method of using a head-mounted display (HMD) to enable the display of confidential data, the method comprising:
  authenticating a user by:
    initiating a login process;
    moving the HMD with the head of the user to facilitate the user looking at a first distinct point in a physical space containing a first object (Xth object) within a predefined time from the initiation of the login process; and
    moving the HMD with the head of the user to facilitate the user looking at a second distinct point in a physical space containing a an Xth plus one object within a predefined time from the completion of looking at the distinct point in the physical space containing the Xth object;
    mapping each object of the N objects to a spatial position in the physical space;
    defining at least one of the N objects as a virtual object in a password space, the password space defined by a square cross-section annular ring surrounding the user; and
    providing access to the confidential data in response to looking at the spatial position in the physical space containing the first object through an Nth object in a predefined order without exceeding any of the predefined times, wherein at least one of the N objects is a physical object positioned within the physical space, and wherein the user may be positioned anywhere within the physical space when looking at the spatial position of each object.

16. The method of claim 15, wherein failing to complete any of the moving steps within the prescribed time limit re-initiates the login process.

17. The method of claim 15, further comprising displaying a password space including a plurality of pre-selected virtual objects.

18. The method of claim 17, wherein at least one of the N objects is a virtual object selected from the pre-selected virtual objects and at least one of the N objects is the physical object that is positioned within the physical space.

19. The method of claim 15, wherein N is greater than or equal to three.

* * * * *